United States Patent [19]

Bailey et al.

[11] 4,161,753

[45] Jul. 17, 1979

[54] VIDEO RECORDING DISK WITH INTERLACING OF DATA FOR FRAMES ON THE SAME TRACK

[75] Inventors: Jack H. Bailey, Millbrook; Gerald H. Ottaway, Pleasant Valley, both of N.Y.

[73] Assignee: International Business Machines Corporation, Armonk, N.Y.

[21] Appl. No.: 814,017

[22] Filed: Jul. 8, 1977

[51] Int. Cl.$^2$ .............................................. H04N 5/76
[52] U.S. Cl. ........................................ 358/128; 360/9; 360/10; 360/33; 360/18; 360/38
[58] Field of Search ................... 360/9, 8, 33, 18, 10, 360/53, 38, 23, 32; 358/128, 127, 136, 142

[56] References Cited

U.S. PATENT DOCUMENTS

| | | | |
|---|---|---|---|
| 3,584,145 | 6/1971 | Cutler | 358/136 |
| 3,789,137 | 1/1974 | Newell | 360/8 |
| 3,811,008 | 5/1974 | Lee | 360/18 |
| 3,878,560 | 4/1975 | Ramage | 360/8 |
| 3,921,132 | 11/1975 | Baldwin | 360/32 |
| 3,931,457 | 1/1976 | Mes | 358/128 |
| 3,939,302 | 2/1976 | Kihara | 179/100.3 V |
| 3,956,619 | 5/1976 | Mundy | 364/727 |
| 4,022,986 | 5/1977 | Leer | 360/18 |
| 4,048,658 | 9/1977 | Nakagawa | 360/9 |

*Primary Examiner*—Bernard Konick
*Assistant Examiner*—Alan Faber
*Attorney, Agent, or Firm*—William S. Robertson

[57] ABSTRACT

A video recording disk is adapted to be rotated at a uniform angular velocity and to have bit positions of substantially equal length along a track, and the longer outer tracks are given more storage positions than the shorter inner tracks. Variable numbers of frames are located on each track revolution, depending on the data capacity of the track. Frames are divided into data units that correspond to a few horizontal lines, and frames on the same track are interlaced so that the data units of each frame are distributed evenly around the track revolution. The associated record player has simplified data storage requirements, particularly for freeze frame display of the television picture and for playing disks that hold video information in a data compression format.

7 Claims, 6 Drawing Figures

VIDEO RECORDING DISK WITH INTERLACING OF DATA FOR FRAMES ON THE SAME TRACK

INTRODUCTION

Video recording disks and disk players are well known, but it will be helpful to review some of the concepts and terminology that particularly apply to the recording disk and player of this invention. In the NTSC system, a single television picture is called a "frame" and is made up of 525 horizontal lines that are transmitted sequentially as two interlaced fields that each have 262½ lines. Frames are transmitted at the rate of approximately 30 frames per second. The television signal carries the information for luminance and chrominance of the picture, for synchronization, and for sound. A video recording disk has a track that carries the information that is necessary to enable the record player to reproduce the television signal. This information may be recorded in a way that gives a binary signal when the record is read. These binary values can be interpreted as 1 and 0 data bits or they can be modulated in some characteristic for analog recording. Video disks that will be described in this specification are read optically, but the invention is more broadly applicable to other recording techniques such as magnetic recording.

One of the goals in video disk development is to provide a sufficiently high recording density for a conveniently long playing time. One known technique for increasing recording density is to locate several frames on each track and to play the record at a proportionately slower angular speed. Another known technique for increasing recording density is to process the television signal to reduce the amount of information that must be recorded. For this processing, it is desirable to record the television signal as binary codes or as analog values that are converted to binary.

SUMMARY OF THE INVENTION

In the video recording disk of this invention, data bits are formed along a track with substantially a uniform size so that there are more bits on the outer tracks than on the inner tracks. The recording disk is adapted to be rotated at a uniform angular velocity that corresponds to one frame per revolution. The track revolutions hold variable numbers of frames, depending on the bit capacity of a track and on the advantage in some embodiments of the invention of providing particular numbers of frames per track, to arrange frames in groups of four for example. The data for each frame is divided into a number of data units, and frames on the same track revolution are interlaced so that the data units for a frame are distributed in sectors around the track. This format provides important advantages for the recording disk and for the associated disk player.

The disk has improved recording density as compared with conventional disks that store the same number of bits on each track revolution.

The record simplifies the apparatus for replaying one frame continuously to produce a freeze frame display. If a conventional recording disk carries more than one frame per revolution it may be necessary to provide a full frame buffer store to supply the signals for replaying a selected frame while the player is in fact reading other frames on the same track revolution. With the disk of this invention, the buffer is only of the size to handle the portion of the frame that is stored along one sector of the disk.

The record also simplifies the apparatus that is needed for playing a disk recording having data compressed within a frame or data compression from frame to frame.

Other features and advantages will appear in the following description of several embodiments of the record and the disk players of this invention.

THE DRAWING

THE APPARATUS OF FIG. 1—CONVENTIONAL FEATURES

Figure 1:
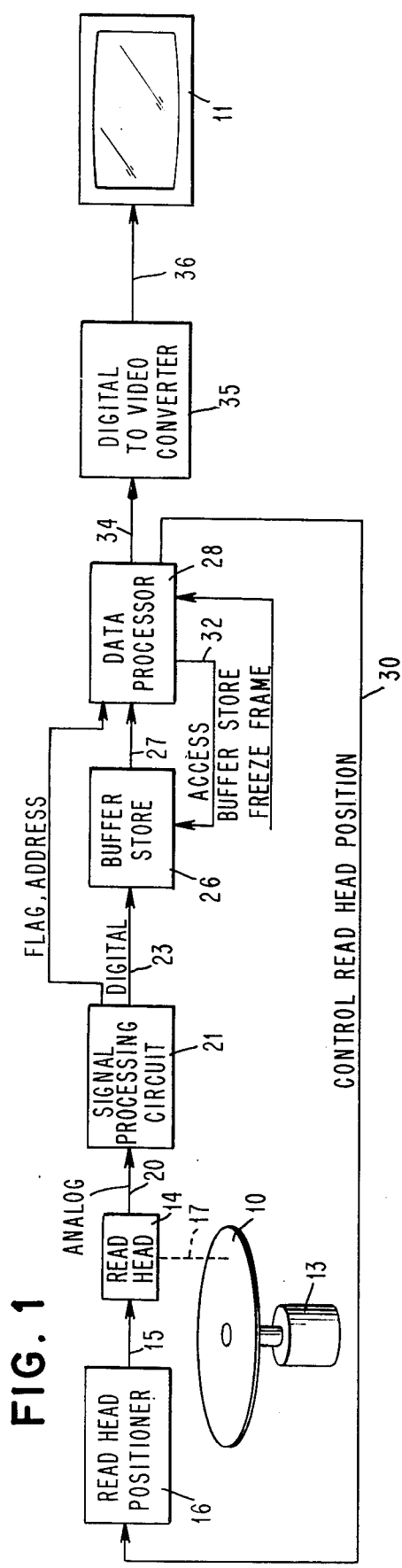
FIG. 1 shows the preferred system for playing the recording disk of this invention.

The apparatus of FIG. 1 reads programming material from a video recording disk 10 and provides a signal that can be used by a television set 11. Disk 10 is mounted on a turntable that is driven by a motor 13 at a uniform angular velocity that corresponds to one frame per revolution. A read head 14 is mechanically connected by suitable means 15 to a read head positioner 16 that moves the read head to a selected position with respect to the disk and advances the read head from one track revolution to the next as the disk is played. Read head 14 has an optical system for illuminating a selected storage position of the record with a light beam 17 and it has optical apparatus for receiving light reflected from the record (or transmitted through the record). The read head produces an electrical signal on a line 20 that corresponds to the form of the data on the recording and this signal is supplied to a signal processing circuit 21. The signal processing circuit produces an output 23 that represents a binary value that is read from the recording. In the examples that have been introduced so far, the 1 and 0 bits at output 23 correspond to spots and the absences of spots on the record. Preferably the spots on the record are modulated in length to represent multi-bit numerical values, and the signal processing circuit includes a converter for producing the output 23. Signal processing circuit 23 may also include means for detecting tracking errors and for making fine adjustments in the position of light beam 17; equivalently, signal line 20 may carry simultaneous signals from a number of adjacent tracks and track detecting components of the signal processing circuit may select one of these signals for the output 23. Signal processing circuit 21 may also include a shift register for converting the serial data from the read head to multi-bit data blocks for output 25 (or a block of tracks can be read in parallel). The signal processing circuit 21 or parts of this circuit may be combined with the read head 14. These components of FIG. 1 are conventional in various forms and the invention is applicable to a wide range of systems that have functionally similar components. It will be helpful to consider these components as a functional group that constitutes means for reading a selected track revolution of the record.

A buffer store 26 receives the digital input on line 23 at the data rate of the record and it supplies a digital output at a selected rate on a multi-bit line 27. A data processor 28 has two separate functions. First, it performs various control functions. It responds to signals contained in words stored in the buffer (as described later) or to other inputs to produce a signal on a line 30 to cause the head positioner 16 to increment or decrement the read head to the next track revolution. (Equivalently, this signal can be applied to the signal processing circuit for electronically switching the read operation to the next track revolution and the head positioner can be controlled by the signal processing circuit as larger changes in head position are required). As another control function, the processor puts addressing and control signals on a line 32 to access buffer 26 for transferring data into and out of the buffer on lines 23 and 27. In a second function, the preferred processor performs logical and arithmetic operations on the data from the buffer before applying the corresponding digital data to an output 34. The buffer may be part of the conventional main data store of the processor.

The data on line 34 is preferably the digital counterpart of the composite video signal and the audio signal that is to be applied to the television set, and a circuit 35 receives the digital signal and produces a modulated carrier signal at its output 36 that is suitable for the television set 11.

More specific aspects of the components of the system of FIG. 1 will be explained further after the following description of the data record.

THE RECORD —FIG. 2

Figure 2:
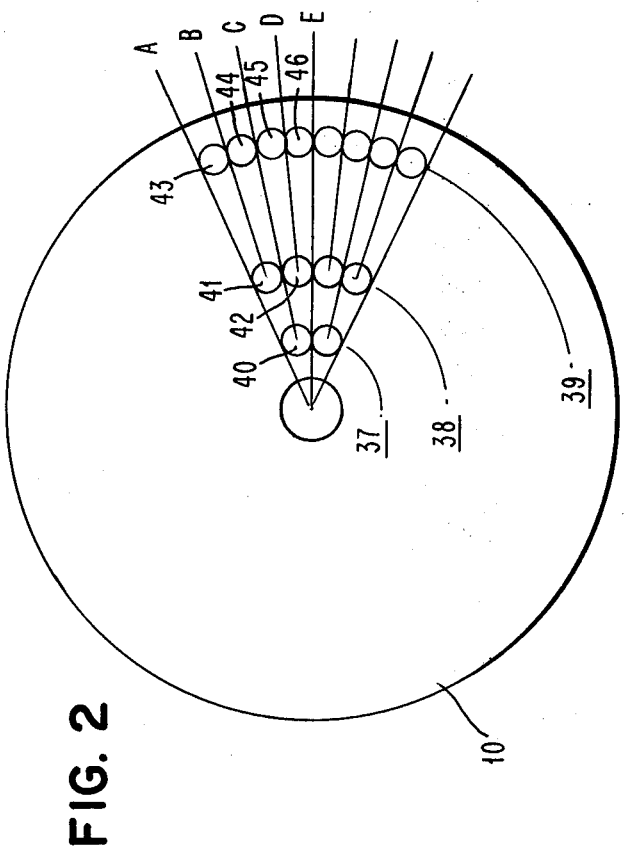
FIG. 2 shows the arrangement of bit storage locations on the recording disk of this invention illustrating the improved recording density.

The improved storage density of this record can be understood from FIG. 2. FIG. 2 shows the record 10 with a number of circles such as 40 that illustrate data bit positions along portions of three representative track revolutions 37, 38 and 39. On the innermost track 37, a position 40 has a minimum length and width within the storage capability of the recording disk and the capability of the player system to detect and display the data. A set of radial lines A through E shows the relationship of recording positions from one track to another. Bit position 40 occupies an arcuate track length between lines A and E. Track 38, which contains bits 41 and 42 has a radius twice the radius of the inner track 37, and these two bit positions occupy the same proportional arcuate length on track 38 as the single bit 40 occupies on track 37. Because the record is read at a constant angular rate, the track length allocated to bit positions 41 and 42 would conventionally hold only a single bit position.

Additional radial lines B and C and bit positions along track 39 illustrate the further improvement in storage density that is possible for a track at a larger radius. Conventionally, the track length that is allocated to the four bit positions 43–46 would be required for a single bit position.

Because the bits in FIG. 2 are the same size on the outer tracks as on the inner tracks, the bits on the outer tracks pass the read head proportionally faster than the bits on the inner track revolutions and when the read head is reading an outer track revolution, it must respond faster and it must respond to a lower total amount of light than when it is reading an inner track.

Figure 3:
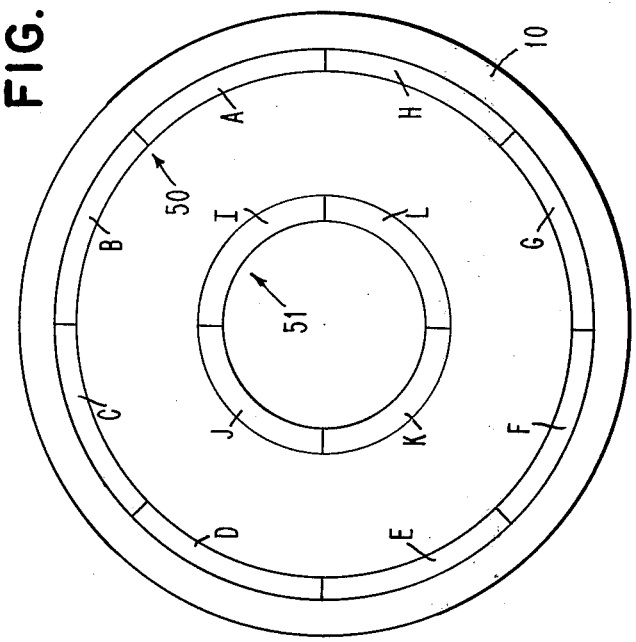
FIG. 3 shows a recording disk with representative tracks illustrating a variable number of frames per track revolution.
Figure 4:
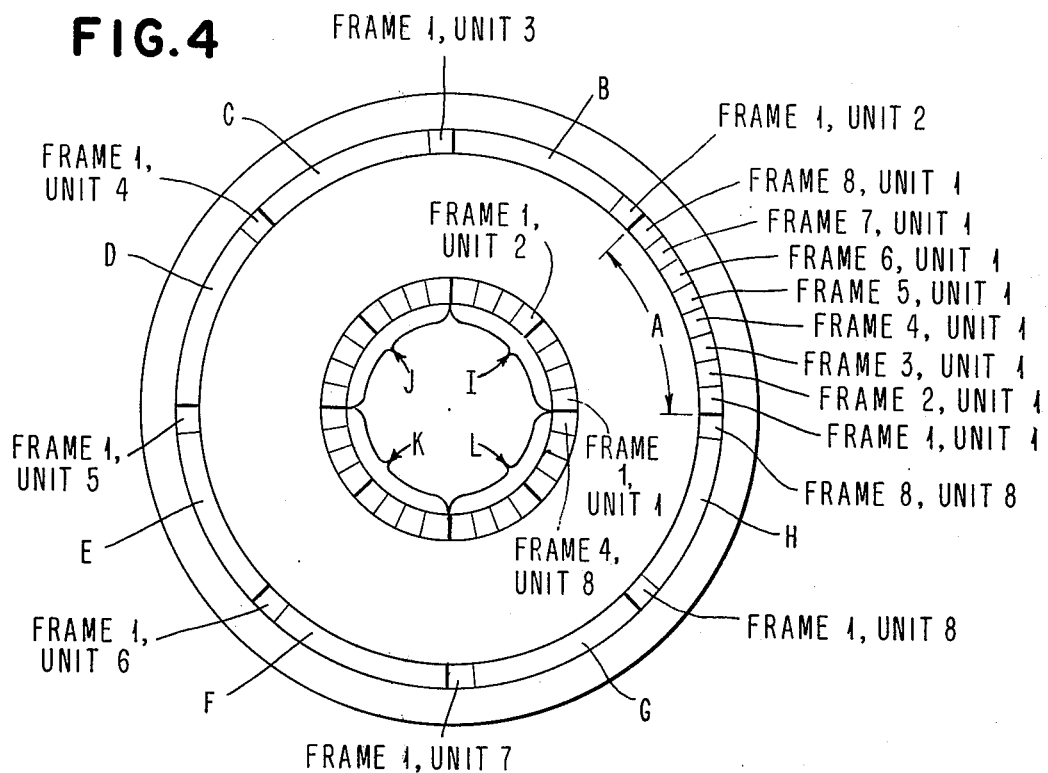
FIG. 4 shows the recording disk of FIG. 3 illustrating interlacing the data units of several frames per track revolution.

THE RECORD —FIGS. 3 and 4

FIG. 3 shows representative track revolutions 50 and 51 where the radius of track 50 is twice the radius of track 51. Track 50 is divided into eight sectors A through H and track 51 is divided into four sectors I through L. The sectors of track 50 are approximately equal in length to the sectors of track 51. From the preceding description of the data organization of FIG. 2, it can be seen that the sectors can store approximately equal units of data, and it will simplify the description to begin with the case in which the data storage capacity of a sector corresponds to one television frame. In this situation, eight frames are stored along track revolution 50 and four frames are stored along track revolution 51. Thus, in the apparatus of FIG. 1 track 50 would be read eight times before head positioner 16 would be controlled by a signal on line 30 to advance to the next track (not shown), and track revolution 51 would be read four times before advancing to the next track. Configuring the tracks with one frame per sector, as implied by FIG. 3, requires a frame buffer to maintain a continuous video output. The track arrangement of this invention displayed in FIG. 4 requires only one-eighth of a frame buffer. (With the data compression technique illustrated by FIG. 5, the buffer size is reduced to about one-sixtieth of a full frame buffer.)

FIG. 4 shows the eight frames that are stored on track 50 each divided into eight data units that are stored in an interlaced fashion along track 50. As the legend outside the record of FIG. 4 illustrates, the track begins with data unit 1 of frame 1, of track 50, which occupies only one-eighth of the track length along sector A. The eight data units of frame 1 are stored at equally spaced locations around the track, and each data unit of frame 1 is followed by the corresponding data unit of frame 2. Track 51 stores four frames in a format that corresponds to the format of track 50, wherein the first four segments of, say, sector I contain, in order, the first unit of the four frames. Then the second four segments of sector I will contain the second units of the four frames; the first half of sector J contains the third units and units 4 through 8 follow this pattern around the track. Thus, in the case in which any track revolution holds a single frame, the data is stored in its conventional sequence.

As the record has been described so far, it provides increased storage density for conventional programming material and it permits a single frame to be played repetitively to form a still picture or a slow motion picture on television set 11. In addition because the record provides variable numbers of frames per revolution, compatible records can have differing data density, for example to permit home recordings to be made at lower density than factory pressed records. The record is particularly advantageous for storing compressed data, as will be described in the next sections of this specification.

RECORD FORMAT FOR FRAME COMPRESSION —FIG. 5

Figure 5:
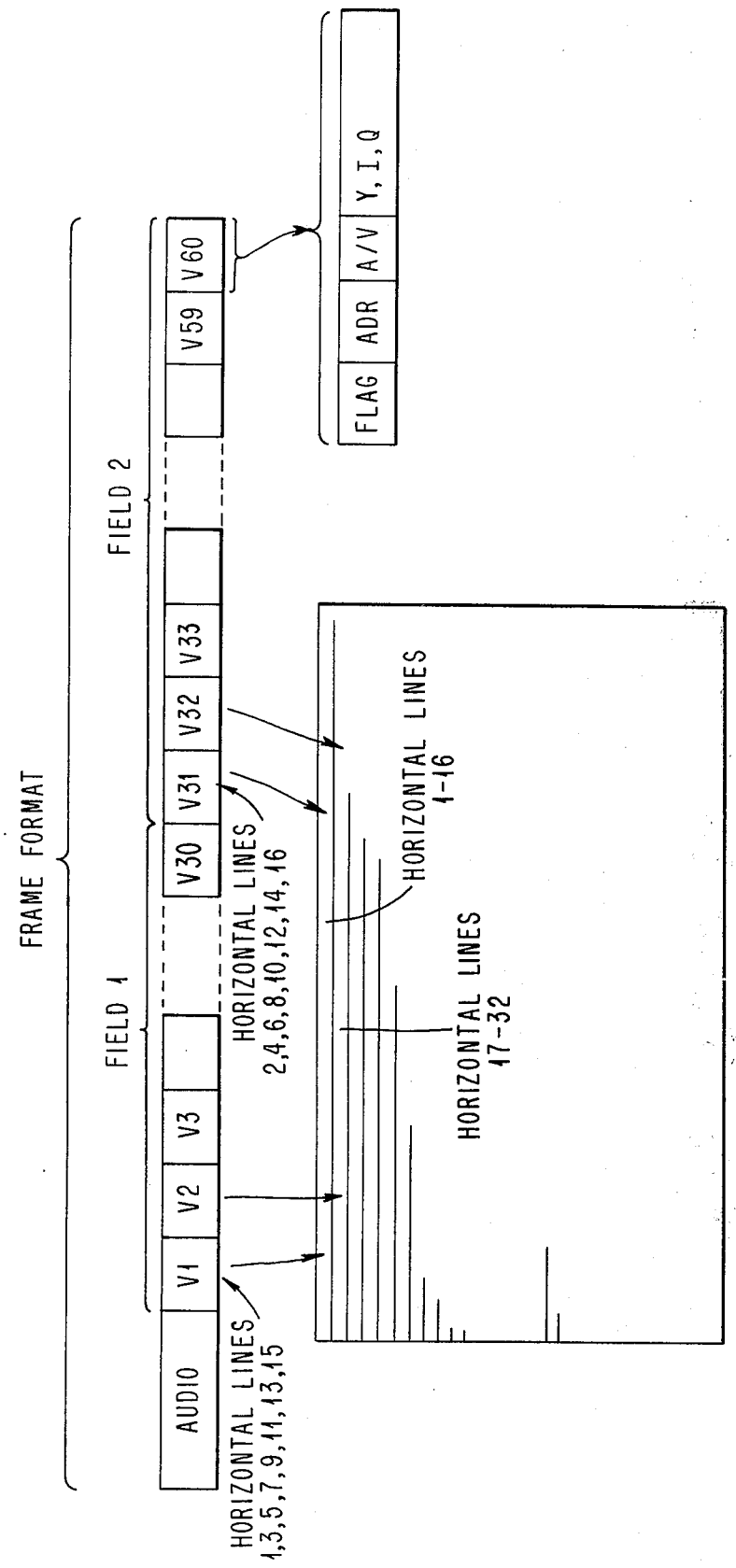
FIG. 5 illustrates the format of the data on the record for illustrating track addressing and data compression within a frame.

In the data compression technique illustrated in FIG. 5, the television picture is divided into segments that each have sixteen horizontal lines, eight lines from the first field and the corresponding eight lines from the second field. FIG. 5 also shows the format of a single frame (without interlacing with other frames). The data track begins with the audio signal and is followed by sixty video units, designated V1 through V60, that each hold eight horizontal lines. As the format has been described so far, it is identical to the normal order of the television signal except for the separation of the audio and the video signals. However, within each eight line segment, the data is further organized as eight by eight arrays of picture elements. A brief description of the data compression technique will help to introduce the later description of the interlaced recording format.

For data compression, each eight by eight array of picture elements is operated on by a suitable transform matrix (e.g., a Walsh-Hadamard matrix). The resulting matrix, designated G, has some terms that represent general picture characteristics and have large numerical values, and other terms that represent detail picture characteristics and have numerical values that are zero or negligibly small. Storing only a fraction of the G terms (e.g., one-sixth) is sufficient for reconstructing an acceptable reproduction of the original eight by eight array of picture elements by means of inverse transform operations on the G terms that are read from the record.

As FIG. 5 also shows, each data unit V1–V60 holds the luminance signal Y and the color signals I and Q, and it has a header that holds a beginning flag, an identifier of the data unit as video or audio, and an address. The header may also hold parity bits and the like. The flag is a unique signal that identifies the beginning of a data unit, as is well known in the communications and recording arts. In the preferred record data will be blocked in packages with a fixed number of bits. Each package of bits is stored as an optically readable spot that has at least a unit length that is suitable to be read optically and represents a zero and it has additional small increments of length to represent a particular numerical value. These spots are separated along the record track by a space that is fixed or is also modulated in length. Thus, in this system for data representation a flag can be formed by any optically recognizable spot or space that does not represent valid data. The audio storage area has a similar header with a flag and address.

If the data units in FIG. 4 were reduced to about one-sixtieth of a frame (about eight lines of picture information), from one-eighth of a frame, then, for storing data that is read from the recording, buffer 26 would require only the storage capacity for eight lines that are in the compressed data form. Data compression within a frame may be about six to one so that the input area of the buffer corresponds to less than two uncompressed lines. As is conventional in data buffering, two such buffer input areas are provided so that an empty buffer area can be loaded while the processor operates on data that has been previously loaded into the other input buffer area.

Conventional means is provided in signal processing circuit 21 for recognizing a gap or other flag and for signaling the processor that the next data from the recording is a header containing an address. The processor uses conventional techniques for recognizing the next address that is to be loaded into the buffer and for gating this data into predetermined storage locations in the buffer. The processor can also recognize from the sequence of frame numbers the time for placing a signal on line 30 to increment the head position to begin reading the next track. For example, the processor can increment a data unit and frame counter as each data segment is loaded into the buffer from the disk and can reset the counter and advance the read operation to the next track revolution after the count equals the highest frame number of the track revolution. (The number of data units per frame will ordinarily be uniform or it can be read from the track; the number of frames on a track is variable and can be read from the track.) Thus, the manual input freeze frame to processor 28 in FIG. 1 causes the processor to access the same frame from the record repetitively or to otherwise change the normal sequence and/or rate of accessing frames. If the signals on line 34 are regenerated from the buffer instead of from the disk, a much larger buffer is required.

Thus, in the record having the format of FIG. 5, the system reads the data for frame 1, unit V1 and stores the data in preassigned locations in buffer 26. The processor operates on this data to form eight lines of decompressed data that is stored in a buffer output area that holds eight full lines. (Alternate output areas are used, as described for the input areas in the preceding paragraph.) The processor may also check the data for parity. As the record is rotated through the location of data unit V2 of frame 1, this data is loaded into the buffer and ready for processing. Thus the system holds the decompressed data for eight lines at the output 34 of the processor and it holds the compressed data for the next eight lines at the output of buffer store 26.

Suppose that data unit V1 has been processed and is being applied to line 34 from the output buffer, that data unit V2 has been loaded into one input area of the buffer and is being processed, and that data unit V3 is being read from the record and loaded into the other input buffer area. If a parity error is found in data unit V2, the entire unit V2 can be cancelled and data unit V1 will be repeated. This repetition will preserve a general continuity of picture content.

RECORD FORMAT FOR FRAME-TO-FRAME DATA COMPRESSION—FIG. 6

Figure 6:
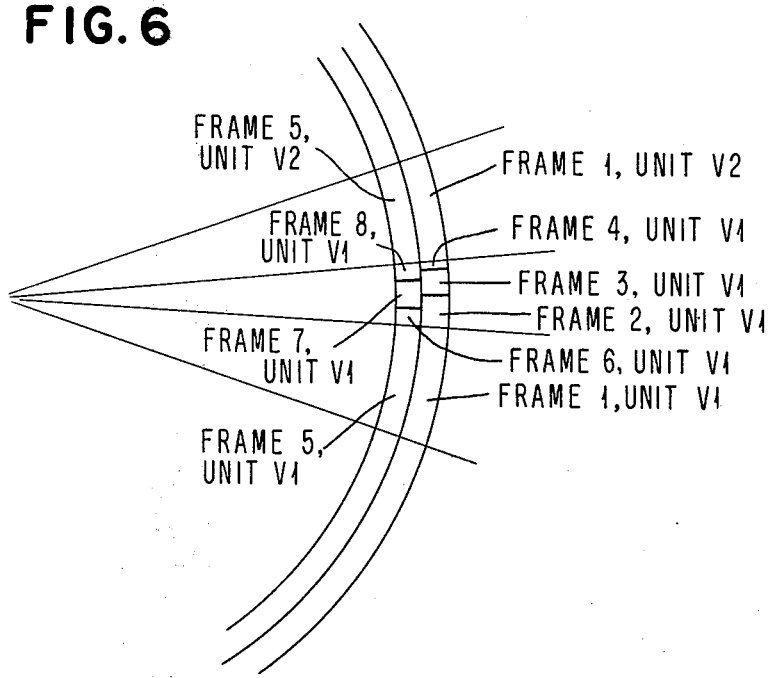
FIG. 6 illustrates the interlacing of data segments for compressing data from frame to frame.

A television program ordinarily is made up of a succession of scenes that each contain a large number of frames. During a scene, the data of the frames may be largely repetitive and changes may occur rather slowly. It is known to compress television data by recording a complete frame at suitable intervals and then recording only changes that occur during the intervening frames. For example, each full frame can be followed by three frames in which only changes are recorded. The record and player of this invention are particularly suitable for this data compression technique. FIG. 6 shows a representative sequence of data along two adjacent track revolutions. The sequence of FIG. 6 begins on the outer track with frame 1, data unit V1, which holds the first eight lines of the frame. Data unit V1 is preferably in the compressed form described in the preceeding section of this specification. Frame 1, unit V1 is followed in succession by frame 2, unit V1, frame 3, unit V1 and frame 4, unit V1. The sequence is the same as in FIG. 4, but the data storage allocated to frames 2, 3, and 4 is very small. This sequence continues with the full data unit for frame 1, unit V2 and the compressed data for units V2 of frames 2, 3, and 4. The inner track continues this format for frames 5–8. Alternatively frame 5, unit V1 can be located on the outer track following frame 4, unit V1.

As FIG. 6 represents, a full frame has a fixed number of bit positions and a sequence of difference frame units has a fixed number of bit positions, but the number of bits assigned to a difference frame unit can be varied as required to better represent the change in data from frame to frame.

The operation to display full frame 1 is identical to the operation already described. For displaying frame 2, the system begins by reloading frame 1, data unit V1 into the buffer store and then loads frame 2, data unit V1. The processor then operates on the data for frame 1, V1 and frame 2, V2 to generate the first eight lines of frame 2. The buffer input areas are suitably larger than in the examples of FIGS. 3 and 4, but the buffer is significantly smaller than the buffer that would otherwise be required to hold all of frame 1 in order to decompress the data for frame 2.

From the preceding description of several embodiments of the record and record player of this invention, those skilled in the art will find other advantages and applications for the record and the player that has been described and will recognize suitable variations in the embodiments of the invention that have been described, within the spirit of the invention and the scope of the claim.

We claim:

1. A video recording disk of the type having a succession of track revolutions, comprising,
    a recording disk, and a plurality of frames representing a sequence to be presented to a television set recorded on each of said succession of track revolutions, said frames each being divided into successive data units each comprising a predetermined number of horizontal lines of a television frame and each of said data units of the same frame being spaced apart in sequence substantially equally around the track revolution and interlaced with data units of other frames of the same track revolution, each of said data units having a header containing an address identifying the sequence of the data unit within a frame and identifying the frame within a sequence of frames.

2. The video recording of claim 1, wherein some frames are recorded to be read and displayed independently of other frames and some frames are recorded by data compression techniques that require data processing based in part on a preceding independent frame, and wherein data units of said compressed frames are located in sequence following the corresponding data unit of the preceding independent frame.

3. The video recording of claim 1 wherein said track revolutions store differing numbers of frames for approximately equal data storage density along any track revolution.

4. The video recording of claim 1 wherein each header has a beginning flag and wherein said flag comprises the absence of data signals for a predetermined interval, data signals being formed by binary manifestations on the record track modulated in length to represent a binary block code.

5. A player for a recording disk having a predetermined number of video frames recorded on each of a plurality of consecutive track revolutions, the video frames being divided into data units for a few horizontal lines of a video picture, said units for each frame being spaced around a track revolution substantially evenly and carrying an identifying header and interlaced with data units of other frames of the same track revolution, said player comprising,
    means for turning a disk at an angular rate corresponding to displaying one frame per revolution and means for reading a selected track revolution of the record,
    a data buffer store and a processor for loading the data units read from a track revolution into the buffer store at their normal sequence and for controlling said means for reading a selected track revolution to advance to the next track revolution when the last data unit of a preceding track revolution has been read.

6. The player of claim 5 including means for operating said processor to read a selected frame repetitively for a freeze frame display.

7. The player of claim 6 wherein a data unit includes for data compression selected terms of transformed data of a plurality of arrays of picture elements for one of said plurality of horizontal lines and said data unit includes error detection bits and wherein said player comprises,
    means for forming signals for horizontal lines from said data units,
    means for detecting errors in data read from the record, and
    means responsive to an error in one data unit for substituting therefor the previous data unit of the same frame.

* * * * *